US010590280B2

(12) United States Patent
Suryawanshi et al.

(10) Patent No.: US 10,590,280 B2
(45) Date of Patent: Mar. 17, 2020

(54) WATERBORNE BASECOAT FOR USE IN VEHICLE REFINISH AND METHODS OF MAKING THE SAME

(71) Applicant: SWIMC LLC, Cleveland, OH (US)

(72) Inventors: Abhijit J Suryawanshi, Warrensville Heights, OH (US); Ali Javadi, Warrensville Heights, OH (US); Swaroop Shendre, Warrensville Heights, OH (US); Kiran B Kashi, Warrensville Heights, OH (US); Joseph P Grill, Jr., Cleveland, OH (US); Alexandra K. Sinclair, Warrensville Heights, OH (US); Colleen E Aitken, Warrensville Heights, OH (US); Prabhjot K. Sahota, Warrensville Heights, OH (US); Michael H. March, Warrensville Heights, OH (US)

(73) Assignee: SWIMC LLC, Cleveland, OH (US)

( * ) Notice: Subject to any disclaimer, the term of this patent is extended or adjusted under 35 U.S.C. 154(b) by 96 days.

(21) Appl. No.: 15/966,638

(22) Filed: Apr. 30, 2018

(65) Prior Publication Data

US 2019/0127591 A1 May 2, 2019

Related U.S. Application Data

(60) Provisional application No. 62/491,497, filed on Apr. 28, 2017.

(51) Int. Cl.
*C09D 5/00* (2006.01)
*C09D 7/65* (2018.01)
*C09D 7/61* (2018.01)
*C09D 175/04* (2006.01)

(52) U.S. Cl.
CPC .............. *C09D 5/002* (2013.01); *C09D 7/61* (2018.01); *C09D 7/65* (2018.01); *C09D 175/04* (2013.01)

(58) Field of Classification Search
CPC ........ C09D 5/002; C09D 175/04; C09D 7/61; C09D 7/65; C09D 5/00

USPC ......................................................... 524/276
See application file for complete search history.

(56) References Cited

U.S. PATENT DOCUMENTS

2015/0259566 A1* 9/2015 Broglie ................ C08J 3/03
428/221

FOREIGN PATENT DOCUMENTS

| CN | 103642395 | * | 3/2014 |
| CN | 106590379 | * | 4/2017 |
| FR | 2879614 | | 6/2006 |
| WO | 1996029371 | | 9/1996 |
| WO | 2000026308 | | 5/2000 |
| WO | 2002024344 | | 3/2002 |
| WO | 2007043633 | | 4/2007 |
| WO | 2009075389 | | 6/2009 |

OTHER PUBLICATIONS

Machine translation of CN 103642395 (Year: 2014).*
Machine translation of CN 106590379 (Year: 2017).*
PCT International Search Report, dated Jul. 2, 2018.
PCT Written Opinion of the International Searching Authority, dated Jul. 2, 2018.

* cited by examiner

*Primary Examiner* — Doris L Lee

(57) ABSTRACT

A waterborne basecoat includes a rheology package having two or more rheology modifiers selected from the group of an ethylene vinyl acetate copolymer wax emulsion, an alkali swellable acrylic copolymer emulsion, a silicate layered clay, and a hydrophobically modified ethylene oxide urethane; a resin system comprising two or more waterborne dispersion resins selected from the group of a urethane-acrylic hybrid resin dispersion having a medium Tg of about 15 to about 35° C., a urethane modified Aldehyde/ketone emulsion having a high Tg of more than about 100° C., and a polyurethane dispersion having a low Tg of less than about −20° C., and a pigment. The pigment may be metallic or non-metallic and may be selected from organic or inorganic pigments. The rheology package and the resin package may be optimized to accommodate properties commonly associated with different types of known pigments.

7 Claims, 2 Drawing Sheets

WATERBORNE BASECOAT FOR USE IN VEHICLE REFINISH AND METHODS OF MAKING THE SAME

This application claims the benefit of U.S. provisional application No. 62/491,197 filed on Apr. 28, 2017, the entirety of which is hereby incorporated by reference.

TECHNICAL FIELD

This disclosure generally relates to coatings for use in refinishing vehicles, specifically waterborne basecoats that includes a combination of waterborne dispersion resins and a combination of rheology modifiers that are optimized to provide the properties of the desired final coating composition.

BACKGROUND

Waterborne basecoats, including metallic waterborne basecoats and chromatic/solid waterborne basecoats, have been used for vehicle refinishing. Existing basecoats are generally provided in various colors and metallic finishes. Waterborne basecoats, however, are subject to environmental challenges, such as changes in humidity and temperature, which may adversely affect orientation of the metallic pigments, overall appearance of the coating, color consistency and the ease of application.

Typically, in the industry, challenges in the overall appearance of waterborne metallic basecoats have been addressed by utilizing very tight quality control standards for the products, using color matching tools such as spectrophotometers, and utilizing alkali swellable waterborne acrylic dispersions. Moreover, environmental robustness is traditionally achieved by using reducers that evaporate at different rates to accommodate different humidity and temperature conditions. All of these challenges require manufacturers to provide multiple skus and product lines to accommodate these different challenges. It would, therefore, be useful, to have a robust rheology package and a simple set of components that could be used to achieve a wide variety of color and metallic finishes in view of known environmental challenges. Additionally, the use of alkali swellable waterborne acrylic dispersion as a resin negatively impacts physical properties of the vehicle refinish coating system including dry adhesion and wet adhesion retention.

Waterborne basecoats consist of toners/colorants made of various pigments (organic/inorganic/special effect) and pigment volume concentrations. Traditionally, basecoats use a single resin system across all pigment families which results in variations in physical properties (dry/wet adhesion) and coating properties (sandability of basecoat, hardness). Thus, it would be useful to build a basecoat system that comprises resins that can compensate for variations in pigments and pigment volume concentrations by simply changing the ratio of resins used in various toners/colorants.

Collectively, a rheology package that provides robust metallic orientation across multiple environments and a resin package that enables consistent properties of various toners/colorants will provide consistency to customers when using various basecoat colors at inconsistent environmental conditions globally. It will also provide improved physical properties including dry adhesion and wet adhesion due to presence of resins that can endure stresses that a vehicle refinish coating system is typically subject to instead of reliance on alkali swellable waterborne acrylic dispersions which easily undergo hydrolysis under extended exposure to high humidity.

SUMMARY

A waterborne basecoat composition comprising a rheology package having two or more rheology modifiers selected from the group of an ethylene vinyl acetate copolymer wax emulsion, an alkali swellable acrylic copolymer emulsion, a silicate layered clay, and a hydrophobically modified ethylene oxide urethane/polyether; and a multi-component resin system comprising at least three waterborne dispersion resins selected from the group consisting of a water reducible polyester, a urethane-acrylic hybrid resin dispersion having a medium Tg of about 15 to about 35° C., a urethane modified aldehyde/ketone emulsion having a high Tg of more than about 100° C., and a polyurethane dispersion having a low Tg of less than about −20° C., and a pigment. In accordance with this invention, the pigment may be metallic or non-metallic and may be selected from organic or inorganic pigments. Further, the rheology package and the resin package may be optimized to accommodate properties commonly associated with different types of known pigments.

DETAILED DESCRIPTION

Figure 1:
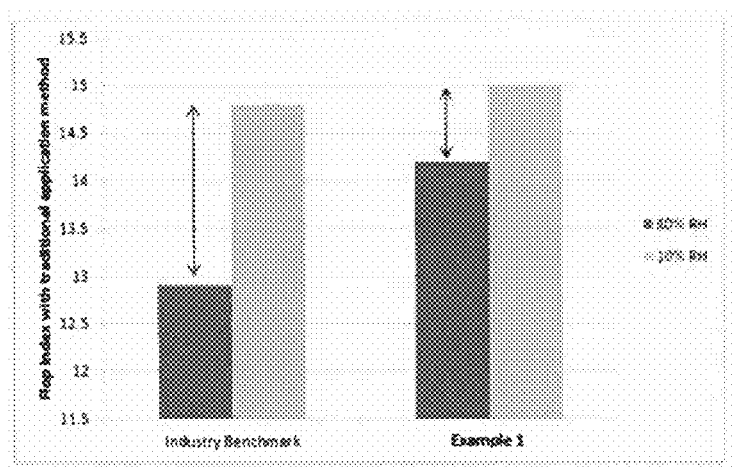
FIG. 1 illustrates 'flop index variation' comparison between Example 1 described here against industry benchmark with a traditional application method at 80% RH and 10% RH.

A waterborne basecoat for use in vehicle refinishing includes an optimized combination of rheology modifiers and waterborne dispersion resins having specific glass transition temperatures ($T_g$). The optimization of the ratios of rheology modifiers provides consistent metallic orientation for basecoats subjected to various environmental conditions, such as various humidity and temperature conditions. And, by optimizing the ratios of a limited number of waterborne dispersion resins having specific $T_g$s, the waterborne basecoat can be formulated to compensate for the properties of a numerous types of pigments, thus providing consistent basecoat properties, regardless of the final color or finish.

In one example, the waterborne basecoat includes an optimized combination of rheology modifiers, or rheology modifier package, including but not limited to a combination of three or more of an ethylene vinyl acetate copolymer wax emulsion, an alkali swellable acrylic copolymer emulsion, a silicate layered clay, and a low-shear hydrophobically modified ethylene oxide urethane and a high-shear hydrophobically modified ethylene oxide urethane. Based on the desired attributes of the finished waterborne basecoat, such as ease of application, color, and environmental robustness of metallic orientation, the disclosed rheology modifiers are present in the basecoat in a certain optimized ratio.

For example, the ratio of the pigment may be determined by the desired opacity, the pigment chemistry, and pigment oil absorption value. And the combination of the rheology modifier is determined by the rheological characteristics the pigment brings to the formulation. If, for example, a specific pigment imparts thixotropy to the formulation, less concentration of a high thixotropic index rheology modifier will be used, and vice versa. In addition, aluminum flake colors may need a different combination of rheology modifiers than chromatic pigments.

In another aspect of the invention, the composition comprises a multicomponent resin system comprising a combination of at least three resins selected from a group consisting of a water reducible polyester, a urethane-acrylic hybrid resin dispersion having a medium $T_g$ of about 15 to about 35° C., a urethane modified Aldehyde/ketone emulsion having a high $T_g$ of more than about 100° C., and a polyurethane dispersion having a low $T_g$ of less than about −20° C. As necessary to the pigment (metallic or non-metallic), the water reducible polyester provides flow/levelling and increased surface energy to facilitate wetting of subsequent coats, a medium Tg urethane-acrylic hybrid dispersion is chosen as a versatile component which is used across many pigments, a high Tg polyurethane dispersion which is used to compensate softness of pigments and/or low pigment volume concentration colors, and a low Tg polyurethane dispersion which is used to compensate hardness of pigments and/or high pigment volume concentrations. An appropriate ratio of these resins can be chosen for each color to provide consistency across a variety of colors and color formulations. Consistency as characterized by sandability of basecoat, appearance, color, dry adhesion and wet adhesion.

Hydrophobically modified alkylene oxide urethane polymer characterized, in part, by hydrophilic polyalkylene oxide groups, examples of which include hydrophilic polyethylene oxide, hydrophilic polyethylene oxide/polypropylene oxide copolymers, and hydrophilic polyethylene oxide/polybutylene oxide copolymers. A preferred hydrophobically modified alkylene oxide polyurethane is a hydrophobically modified ethylene oxide polyurethane (HEUR). These rheology modifiers are typically classified as either low shear rate viscosity builders (Stormer viscosity builders, also known as KU viscosity builders) or high shear rate viscosity builders (ICIbuilders). Without intending to be bound to any theory, the low shear hydrophobically modified EO urethane provides better metallic orientation, spray atomization and in-can viscosity control, whereas the mid-high shear hydrophobically modified ethylene-oxide urethane provides better flow and leveling, and sag resistance.

Superior environmental robustness for metallic orientation (flop index and metal control) can be achieved with the following rheology modifier composition:

TABLE 1

Rheology Modifier Package

| Rheology Modifier Component | Wt % Range (based on Total Formulation) |
|---|---|
| Ethylene vinyl acetate copolymer wax emulsion | 2.0-6.0 |
| Alkali swellable acrylic copolymer emulsion | 0.0-2.0 |
| Silicate layered clay | 0.1-0.3 |
| Hydrophobically-modified ethylene oxide urethane - low shear | 0.05-1.5 |
| Hydrophobically-modified ethylene oxide urethane/polyether - high shear | 0.10-0.4 |

Wt % Range is expressed in weight % of the components based on total basecoat formulation weight.

Commercially available rheology modifiers for ethylene vinyl acetate copolymer wax emulsion include Aquatix 8421 (available from Byk Additives); for alkali swellable acrylic copolymer emulsion include ASE 60R, Rheolate® 125 (Elementis Specialties), Rheovis® AS1130 (BASF), Acrysol® TT615 (Dow Chemical); for silicate layered clay Laponite RD (Byk); for hydrophobically modified ethylene oxide urethane—low shear include Optiflow H7500 (Byk), Coapur™ XS 83 (Arkema), Rheovis® PU 1191 (BASF) and Acrysol™ Rm 12W (Dow) and for hydrophobically modified ethylene oxide urethane-high shear include Acrysol™ RM6000 (Rohm&Haas) and Rheovis® PE 1331 (BASF).

In addition to the rheology modifiers, the waterborne basecoat also includes an optimized combination of waterborne dispersion resins, or a waterborne dispersion package, that includes at least three resin technologies with varying glass transition temperatures. Specifically, the waterborne dispersion resin package includes, but is not limited to, a combination of at least three of a water-reducible polyester, a urethane-acrylic hybrid resin dispersion having a medium $T_g$ of about 15 to about 35° C., a urethane modified aldehyde/ketone emulsion or a polyurethane dispersion having a high $T_g$ of more than about 100° C., and a polyurethane dispersion having a low $T_g$ of less than about −20° C. The waterborne dispersion resins may be present in the waterborne basecoat in an amount designed to provide consistent basecoat characteristics, appearance properties, and physical properties (hardness, dry adhesion, wet adhesion), across different pigment families.

Optimized resin combinations and ratios, including beneficial properties of such resins, for the waterborne basecoat systems of this invention are listed in Table 2:

TABLE 2

Resin Combinations for Waterborne Basecoat Systems

| Resin | Wt % Range (based on total basecoat composition) | Physical optimization |
|---|---|---|
| Water-reducible Polyester | 2-10 wt % | Flow/leveling; lowers surface energy; higher concentrations may impact wet adhesion |
| Polyurethane dispersion | 2-20 wt % | Low Tg; soft resin; provides improved wet adhesion due to good tensile properties of the resin alone; high concentrations may impact sandability. |
| Urethane-acrylic hybrid resin dispersion | 5-30 wt % | Medium Tg; provides optimum hardness/softness and functional group anchors for dry/wet adhesion. |
| Urethane-modified aldehyde/ketone emulsion | 0-10 wt % | High Tg; provides hardness for low pigment loading and/or soft pigmented toners; higher concentrations will negatively impact adhesion and/or appearance. |

The above weight percentages (wt %) are based on weight of total basecoat formulation.

For example, for a waterborne basecoat that is jet black in color, therefore having a lower pigment loading, a higher ratio of medium $T_g$ and high $T_g$ waterborne dispersion resins may be used, providing a relatively hard resin combination.

Conversely, for a basecoat that is white in color, and therefore having a higher pigment loading, a higher ratio of lower $T_g$ and medium $T_g$ waterborne dispersion resins may be used, providing a relatively soft resin combination. Thus, the ratios of the lower, medium and high Tg waterborne resins can be optimized based on the pigment concentration.

Examples of commercially available resins for water reducible polyester include Setaqua™ 6407 and Setal 6306 (Nuplex Resins LLC); for urethane-acrylic hybrid resin dispersion having a medium Tg of about 15 to about 35° C. include Joncryl® HY B6340 (BASF), Daotan® TW 6474/37WA (Allnex), Hybridur 570 and Hybridur 580 (Evonik); for urethane-modified aldehyde/ketone emulsion having a high Tg of more than about 100° C. include Tego® DS 50 (Evonik); and for polyurethane dispersion having a low Tg of less than about −20° C. include Dispurez 201 (Incorez), Hauthane HD-2501 and Hauthane HD-2101 (Hauthaway), In accordance with this invention, the waterborne basecoat can be easily optimized for numerous color and metallic pigment concentrations using differing ratios of the same rheology modifiers and resins. In the following examples, weight percentage (wt %) is based on total weight percent of basecoat composition.

EXAMPLES

Example 1

A waterborne basecoat having a medium bright silver pigment was prepared using the optimized rheology and resin packages described herein.

| Rheology package components | Wt % (based on total basecoat composition weight) |
| --- | --- |
| Ethylene vinyl acetate copolymer wax emulsion | 3.66 |
| Alkali swellable acrylic copolymer emulsion | 0.73 |
| Silicate layered clay | 0.14 |
| Hydrophobically modified ethylene oxide urethane - low shear | 0.05 |
| Hydrophobically modified ethylene oxide polyether/urethane - high shear | 0.23 |

The resin combination was prepared using the following weight percentages:

| Resin components | Wt % |
| --- | --- |
| Water reducible polyester | 2.98 |
| Medium Tg urethane-acrylic hybrid resin dispersion | 22.16 |
| Low Tg polyurethane dispersion | 1.53 |
| Urethane modified aldehyde/ketone emulsion | 0.55 |

Figure 2:
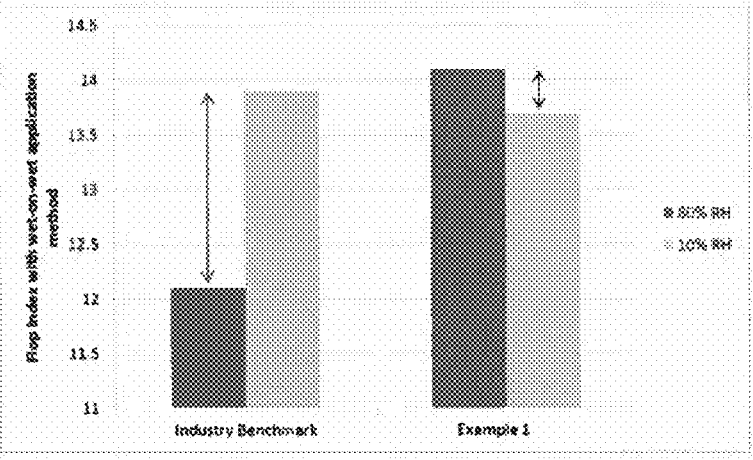
FIG. 2 illustrates 'flop index variation' comparison between Example 1 described here against industry benchmark with a wet-on-wet application method at 80% RH and 10% RH

It can be seen from the results of Flop Index in FIG. 1 and FIG. 2 that the invention described in Example 1 not only provides higher flop index but also provides better consistency of flop index at 10% and 80% RH humidity conditions with two different application techniques. The flop index is the measurement of the change in reflectance of a metallic color as it is rotated through the range of viewing angles. Moreover, the flop index is a measure of how close to parallel the aluminum flakes are to the substrate. In general, the closer to parallel, the higher the flop index. A flop index of 0 indicates a solid color which may not contain metallic flake, while a very high flop metallic basecoat color may have a flop index of more than 22. In general, the Flop Index can be defined by any suitable method known in the art. In this example the flop index was measured using the BYK-mac i spectrophotometer with viewing angles 15°, 45° and 110°.

Example 2

In another embodiment, a waterborne basecoat was prepared using optimized rheology package described herein and was applicable to aluminum/silver pigments of multiple dimensions including fine sized flake (10-15 microns), medium sized flake (15-20 microns) to coarse sized flake (20-25 microns) with various shapes including silver dollar and cornflake shape.

| Rheology package components | Wt % |
| --- | --- |
| Ethylene vinyl acetate copolymer wax emulsion | 4.18 |
| Alkali swellable acrylic copolymer emulsion | — |
| Silicate layered clay | 0.22 |
| Hydrophobically modified ethylene oxide urethane - low shear | 0.82 |
| Hydrophobically modified ethylene oxide urethane - high shear | 0.22 |

Example 3

A basecoat formulation was prepared with a medium bright silver toner with following rheology package:

| Rheology package components | Wt % |
| --- | --- |
| Ethylene vinyl acetate copolymer wax emulsion | 4.21 |
| Alkali swellable acrylic copolymer emulsion | — |
| Silicate layered clay | 0.23 |
| Hydrophobically modified ethylene oxide urethane - low shear | 1.35 |
| Hydrophobically modified ethylene oxide urethane - high shear | 0.23 |

The flop index and metallic orientation (M15) of the invention in Example 3 (FIG. 3) was compared to the flop indices and metallic orientations of three existing products.

The metallic orientation (M15) was measured for each sample. The metallic orientation of the flake pigment in the coatings was measured using a cloud runner (or mottling meter), however the metallic orientation may be measured by any suitable method known in the art. In this example, the M15 values signify the orientation of the aluminum flake to the substrate when viewed at a 15 degree angle. Generally, a M15 value of less than 4.5 indicates an acceptable flake orientation.

Both the flop index and M15 were measured across three environmental conditions, 60° F. with 90% humidity, 75° F. with 30% relative humidity, and 100° F. with 10% relative humidity, and at two guns speeds of 1100 inches/min and 1400 inches/min.

Figure 3:
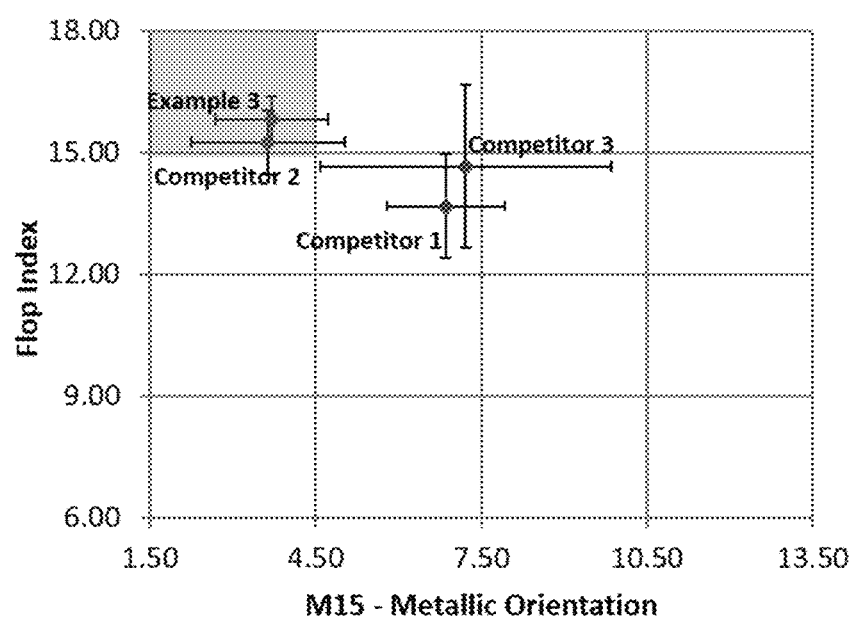
FIG. 3 illustrates medium bright silver pigment having a desirably high flop index with a relatively low metallic orientation, indicating a more brilliant and less cloudy metallic finish.

As shown in FIG. 3, Example 3 with the medium bright silver pigment was shown to have a desirably high flop index with a relatively low metallic orientation, indicating a more brilliant and less cloudy metallic finish. Comparatively, only the Competitor 2 pigment was close, however, having a lower flop index. Moreover, it should be noted that the example of this invention achieved the same or similar flake orientation across varying humidity and temperature conditions indicating a more robust metallic orientation across various environmental conditions.

Example 4

A white toner that represents a family of high pigment volume concentration toner pigmented with inorganic pigment, was formulated as described below. It can be observed that superior dry adhesion retention and wet adhesion retention was achieved in this example.

The dry adhesion is measured by ISO 2409, and the wet adhesion is measured by GMW-14729 high humidity test standard.

| Number | Water reducible polyester (Wt %) | Medium Tg urethane-acrylic hybrid resin dispersion (Wt %) | Low Tg polyurethane dispersion (Wt %) | Urethane modified ald/ketone emulsion (High Tg) (Wt %) | % dry adhesion retention on urethane primer | % wet adhesion retention on urethane primer |
| --- | --- | --- | --- | --- | --- | --- |
| Example 4 | 11.52 | 11.19 | 16.79 | — | 100% | 68% |

Example 5

A jet black toner that represents a family of low pigment volume concentration toner pigment with organic pigment, was formulated as described below. It can be observed that superior dry adhesion retention and wet adhesion retention was achieved in this example. It can also be observed that the formulation had superior Jetness (342). Jetness is pertinent to a Jet Black Toner.

It should be also noted that, when compared to Example 4 with a white pigment at high pigment volume concentration, the jet black toner at low pigment concentration required lower concentration of low Tg resin as compared to medium Tg resin. Thus, exemplifying ability to manipulate the resin concentrations based on the need of various pigments and pigment volume concentrations.

| Number | Water reducible polyester (Wt %) | Medium Tg urethane-acrylic hybrid resin dispersion (Wt %) | Low Tg polyurethane dispersion (Wt %) | Urethane modified ald/ketone emulsion (High Tg) (Wt %) | % dry adhesion retention on urethane primer | % wet adhesion retention on urethane primer | Jetness |
| --- | --- | --- | --- | --- | --- | --- | --- |
| Example 5 | 3.85 | 17.14 | 12.46 | — | 100% | 100% | 342 |

Example 6

A comparison of waterborne basecoat having jet black pigment is provided utilizing resin combination as in Example 5, and compared against competitive samples. The jetness (or blackness), the distinctness of image (DOI) (a quantification of the deviation of the direction of light propagation from the regular direction by scattering during transmission or rejection of light), and sandability, of the jet black example and compared to a competitor 1, competitor 2, and competitor 3 sample. The jetness was calculated by L, a, and b values using an X-rite 946-spectro-1045. DOI was measured using a Dual Wavescan instrument. And, the sandability was measured based on the ease of sanding the applied coating. However, any suitable method known to those of skill in the art could be used to measure these characteristics.

As shown in FIG. 6, as compared to the target values, the jet black invention prototype came the closest to the target values of the four samples, having a relatively high jetness, DOI, and suitable sandability. It should be noted that in FIGS. 4-6, "+++" denotes that the sample produced excellent desired properties; "++" denotes that the sample produced good desired properties; "+" denotes that the sample produced acceptable desired properties; and "---" denotes that the sample produced unacceptable properties.

RESULTS

FIG. 1 shows 'flop index variation' comparison between Example 1 described here against industry benchmark with a traditional application method at 80% RH and 10% RH.

FIG. 2 shows 'flop index variation' comparison between Example 1 described here against industry benchmark with a wet-on-wet application method at 80% RH and 10% RH.

The flop index and metallic orientation (M15) of the invention in Example 3 (FIG. 3) was compared to the flop indices and metallic orientations of three existing products.

The dry adhesion is measured by ISO 2409, and the wet adhesion is method by GMW-14729 high humidity test standard, Tables 1-3 illustrates test data comparing jetness, DOI, and sandability of exemplary pigmented compositions compared to existing base coat formulations.

TABLE 1

|  | Competitor 1 | Competitor 2 | Competitor 3 | Example 4 | Target |
| --- | --- | --- | --- | --- | --- |
| Jetness | +++ | +++ | +++ | +++ | +++ |
| DOI (Drop Coat) | +++ | +++ | --- | +++ | +++ |
| Sandability | --- | --- | +++ | + | ++ |

TABLE 2

|  | Competitor 1 | Competitor 2 | Competitor 3 | Example 5 | Target |
| --- | --- | --- | --- | --- | --- |
| Jetness | +++ | +++ | +++ | +++ | +++ |
| DOI (Drop Coat) | +++ | +++ | --- | +++ | +++ |
| Sandability | --- | --- | +++ | + | ++ |

TABLE 3

|  | Competitor 1 | Competitor 2 | Competitor 3 | Example 6 | Target |
|---|---|---|---|---|---|
| Jetness | +++ | +++ | +++ | +++ | +++ |
| DOI (Drop Coat) | +++ | +++ | --- | +++ | +++ |
| Sandability | --- | --- | +++ | + | ++ |

It is noted that the terms "substantially" and "about" may be utilized herein to represent an inherent degree of uncertainty that can be attributed to any quantitative comparison, value, measurement, or other representation. These terms are also utilized herein to represent a degree by which a quantitative representation may vary from a stated reference without resulting in a change in the basic function of the subject matter at issue.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims.

What is claimed is:

1. A waterborne basecoat composition comprising:
    a rheology package comprising two or more rheology modifiers selected from the group consisting of an ethylene vinyl acetate copolymer wax emulsion, an alkali swellable acrylic copolymer emulsion, a silicate layered clay, and a hydrophobically modified ethylene oxide urethane; and
    a multicomponent resin system comprising a combination of at least three waterborne dispersion resins selected from the group consisting of a water reducible polyester, a urethane-acrylic hybrid resin dispersion having a medium $T_g$ of about 15 to about 35° C., a urethane modified aldehyde/ketone emulsion having a high $T_g$ of more than about 100° C., and a polyurethane dispersion having a low $T_g$ of less than about −20° C.

2. The waterborne basecoat composition of claim 1, wherein the rheology package comprises:
    (a) between 2.0 wt % and 6.0 wt % ethylene vinyl acetate copolymer wax emulsion;
    (b) between 0.0 to 2.0 wt % of an alkali swellable acrylic copolymer emulsion;
    (c) between 0.1 wt % to 0.3 wt % of a silicate layered clay;
    (d) between 0.05 wt % to 1.5 wt % of a low shear hydrophobically modified ethylene oxide urethane; and
    (e) between 0.1 wt % to 0.4 wt % of a mid-high shear hydrophobically modified ethylene oxide urethane;
    based on the total basecoat composition.

3. The waterborne basecoat composition of claim 1, wherein the resin system comprises:
    (a) between 2 wt % to 10 wt % of a water reducible polyester;
    (b) between 5 wt % to 30 wt % of a urethane-acrylic hybrid resin dispersion having a $T_g$ of about 15 to about 35° C.;
    (c) between 0 wt % to 10 wt % of a urethane-modified aldehyde/ketone emulsion having a $T_g$ of more than about 100° C.; and
    (d) between 2 wt % to 20 wt % of a polyurethane dispersion having a low $T_g$ of less than about −20° C.;
    based on the total basecoat composition.

4. The waterborne basecoat composition of claim 1, wherein the flop index is between 8 and 25 as measured by the Byk-mac device at L15, L45 and L110 angles.

5. The waterborne basecoat composition of claim 1, wherein the metallic orientation (M15) is between 1.5 and 6.0 as measured by cloud runner.

6. The waterborne basecoat composition of claim 1, wherein the basecoat further comprises a pigment.

7. The waterborne basecoat composition of claim 6, wherein the pigment is metallic.

* * * * *